(12) United States Patent
Ogumi et al.

(10) Patent No.: US 10,153,491 B2
(45) Date of Patent: Dec. 11, 2018

(54) SECONDARY BATTERY

(71) Applicants: KYOTO UNIVERSITY, Kyoto-shi, Kyoto (JP); TOYOTA JIDOSHA KABUSHIKI KAISHA, Toyota-shi, Aichi-ken (JP); HONDA MOTOR CO., LTD., Tokyo (JP)

(72) Inventors: Zempachi Ogumi, Kyoto (JP); Toshiro Hirai, Kyoto (JP); Jun-ichi Yamaki, Kyoto (JP); Hideyuki Horino, Kyoto (JP); Ken-ichi Okazaki, Kyoto (JP); Yukinori Koyama, Kyoto (JP)

(73) Assignees: KYOTO UNIVERSITY, Kyoto (JP); TOYOTA JIDOSHA KABUSHIKI KAISHA, Toyota (JP); HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 15/100,132

(22) PCT Filed: Dec. 19, 2014

(86) PCT No.: PCT/JP2014/083766
§ 371 (c)(1),
(2) Date: May 27, 2016

(87) PCT Pub. No.: WO2015/098766
PCT Pub. Date: Jul. 2, 2015

(65) Prior Publication Data
US 2017/0033359 A1    Feb. 2, 2017

(30) Foreign Application Priority Data
Dec. 26, 2013   (JP) ................................ 2013-270415

(51) Int. Cl.
*H01M 4/58*   (2010.01)
*H01M 10/0525*   (2010.01)
(Continued)

(52) U.S. Cl.
CPC ......... *H01M 4/582* (2013.01); *H01M 4/5805* (2013.01); *H01M 10/052* (2013.01);
(Continued)

(58) Field of Classification Search
CPC ............. H01M 4/582; H01M 10/0525; H01M 10/0568; H01M 4/5805; H01M 10/054;
(Continued)

(56) References Cited

U.S. PATENT DOCUMENTS

| | | | |
|---|---|---|---|
| 8,658,309 B2 * | 2/2014 | Yazami | ............ H01M 10/0567 |
| | | | 429/188 |
| 2009/0029237 A1 * | 1/2009 | Yazami | ................... H01M 4/38 |
| | | | 429/50 |

(Continued)

FOREIGN PATENT DOCUMENTS

| | | |
|---|---|---|
| CN | 101467287 A | 6/2009 |
| JP | 2009-527441 A | 7/2009 |

(Continued)

OTHER PUBLICATIONS

Lei, Linsen et al. "High-Capacity Lithium-Ion Battery Conversion Cathodes Based on Iron Fluoride Nanowires and Insights into the Conversion Mechanism," Nano Letters, Oct. 29, 2012, vol. 12, pp. 6030-6037.

*Primary Examiner* — Stewart A Fraser
(74) *Attorney, Agent, or Firm* — Oliff PLC (57) ABSTRACT

A secondary battery in which the difference between the voltage at the time of discharging and the voltage at the time of charging is small, ensuring good energy efficiency, and the charge/discharge life is long. Therefore, in order to attain the above-described object, a secondary battery containing a positive electrode, a negative electrode, and an electrolytic solution, wherein at least one of the positive electrode and the negative electrode contains, as the active material, at (Continued)

least one selected from the group consisting of a metal ion-containing fluoride, a metal oxide, a metal sulfide, a metal nitride, and a metal phosphide; the electrolytic solution contains an anion receptor; and the anion receptor forms a salt or a complex with an anion contained in the active material, thereby enabling the active material to dissolve in the electrolytic solution.

26 Claims, 2 Drawing Sheets (51) Int. Cl.
*H01M 10/0567* (2010.01)
*H01M 10/052* (2010.01)
*H01M 10/0569* (2010.01)
*H01M 10/054* (2010.01)
*H01M 10/0568* (2010.01)

(52) U.S. Cl.
CPC ..... *H01M 10/054* (2013.01); *H01M 10/0525* (2013.01); *H01M 10/0567* (2013.01); *H01M 10/0568* (2013.01); *H01M 10/0569* (2013.01); *H01M 4/5815* (2013.01); *H01M 2300/0025* (2013.01); *Y02T 10/7011* (2013.01)

(58) Field of Classification Search
CPC ......... H01M 10/0569; H01M 10/0567; H01M 10/052
See application file for complete search history.

(56) References Cited

U.S. PATENT DOCUMENTS

| | | | |
|---|---|---|---|
| 2012/0088161 A1* | 4/2012 | Yoon | H01M 4/622 429/332 |
| 2012/0164541 A1* | 6/2012 | Darolles | H01M 6/164 429/326 |
| 2014/0030559 A1* | 1/2014 | Yazami | H01M 4/38 429/50 |

FOREIGN PATENT DOCUMENTS

| | | |
|---|---|---|
| JP | 2014-501434 A | 1/2014 |
| WO | 2007/098478 A2 | 8/2007 |
| WO | 2012/087414 A2 | 6/2012 |

* cited by examiner

FeF$_2$//0.2 M TPFPB + 1M LiPF$_6$-EC/DMC (1/1) //Li
Discharged at 0.075 mA cm$^{-2}$ to 1.0V
Charged at 0.075 mA cm$^{-2}$ to 4.5 V FeF$_2$//1M LiPF$_6$-EC/DMC (1/1) //Li
Discharged at 0.075 mA cm$^{-2}$ to 1.0V
Charged at 0.075 mA cm$^{-2}$ to 4.5 V

SECONDARY BATTERY

TECHNICAL FIELD

The present invention relates to a secondary battery.

BACKGROUND ART

The characteristics of a battery using a metal fluoride as an active material include, for example, utilization of a conversion reaction. As such a battery, there is known, for example, a lithium ion battery where the cation in the electrolytic solution is $Li^+$. A lithium ion battery utilizing a conversion reaction can have a capacity of, for example, from 2 to 3 times that of a lithium ion battery utilizing a normal insertion reaction (e.g., Non-Patent Document 1).

RELATED ART

Non-Patent Document

[Non-Patent Document 1] Linsen Li, Fei Meng, and Song Jin, "High-Capacity Lithium-Ion Battery Conversion Cathodes Based on Iron Fluoride Nanowires and Insights into the Conversion Mechanism", Nano Lett., 2012, 12 (11), pp. 6030-6037

SUMMARY OF THE INVENTION

Problems to be Solved by the Invention

However, such a battery system has a problem that the difference between the voltage at the time of discharging and the voltage at the time of charging is extremely large, leading to very undesirable energy efficiency, and the charge/discharge life is short.

An object of the present invention is to provide a secondary battery, in which the difference between the voltage at the time of discharging and the voltage at the time of charging is small, ensuring good energy efficiency, and the charge/discharge life is long.

Means to Solve the Problems

In order to attain the above-described object, the secondary battery of the present invention is a secondary battery containing a positive electrode, a negative electrode, and an electrolytic solution, wherein at least one of the positive electrode and the negative electrode contains, as the active material, at least one selected from the group consisting of a metal ion-containing fluoride, a metal oxide, a metal sulfide, a metal nitride, and a metal phosphide; wherein the electrolytic solution contains an anion receptor; wherein the anion receptor forms a salt or a complex with an anion contained in the active material, thereby enabling the active material to dissolve in the electrolytic solution; and wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide.

Effects of the Invention

According to the present invention, a secondary battery, in which the difference between the voltage at the time of discharging and the voltage at the time of charging is small, ensuring good energy efficiency, and the charge/discharge life is long, can be provided.

DETAILED DESCRIPTION OF THE PRESENT INVENTION

The present invention is explained by referring to the embodiments below. However, the present invention is not limited by the following description.

In the secondary battery of the present invention, as described above, the anion receptor forms a salt or a complex with an anion contained in the active material, whereby the active material can be dissolved in the electrolytic solution. Due to this configuration, in the present invention, a secondary battery, in which the difference between the voltage at the time of discharging and the voltage at the time of charging is small (the hysteresis is small), ensuring good energy efficiency, and the charge/discharge life (cycle life) is long, can be provided.

In the secondary battery of the present invention, it is preferred that the active material contained in at least one of the positive electrode and the negative electrode is a metal ion-containing fluoride; and the anion receptor forms a salt or a complex with a fluoride ion of the metal ion-containing fluoride, thereby enabling the metal ion-containing fluoride to dissolve in the electrolytic solution. The "fluoride" as used in the present invention indicates a compound of fluorine with another element or atomic group. Therefore, in the present invention, the "metal ion-containing fluoride" may contain only a metal ion and a fluoride ion (i.e., may be a metal fluoride) or may further contain an element or an atomic group other than a metal ion and a fluoride ion. The "metal ion-containing fluoride" of the present invention specifically includes, for example, a metal fluoride and a metal oxyfluoride. In the secondary battery of the present invention, the metal ion-containing fluoride is preferably at least one of a metal fluoride and a metal oxyfluoride.

The reason why in the secondary battery of the present invention, the difference between the voltage at the time of discharging and the voltage at the time of charging is small (the hysteresis is small), ensuring good energy efficiency, and the charge/discharge life (cycle life) is long, is not clear, but it is believed to be, for example, as follows.

Figure 1:
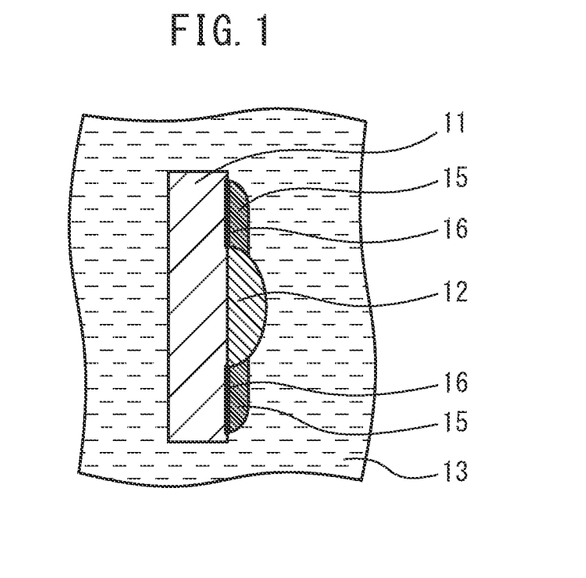
FIG. 1 is a view schematically illustrating the cross-section of an electrode (positive electrode or negative electrode) of the secondary battery of the present invention.
Figure 2:
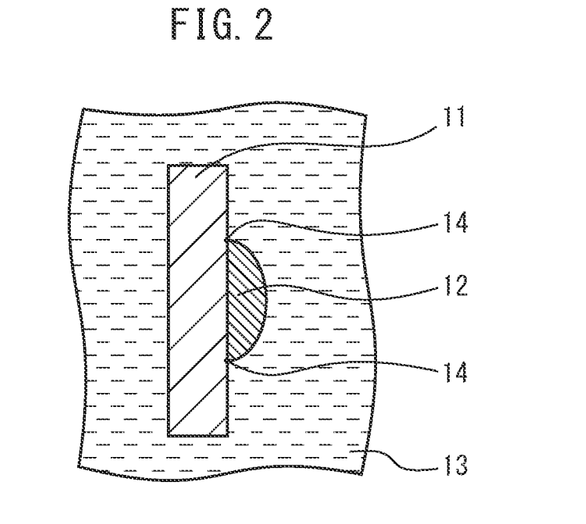
FIG. 2 is a cross-sectional view of an electrode having the same configuration as in FIG. 1 other than the electrode active material is in the condition of being not dissolved in the electrolytic solution.

FIG. 1 schematically illustrates the cross-section of an electrode (positive electrode or negative electrode) of the secondary battery of the present invention. As shown in the figure, this battery has an electrode in which an electrode active material 12 is provided on an electrode (positive electrode or negative electrode) collector 11. The periphery of the electrode is surrounded by an electrolytic solution 13. On the other hand, FIG. 2 illustrates the cross-sectional of an electrode having the same configuration as in FIG. 1 other than the electrode active material is in the condition of being not dissolved in the electrolytic solution. In FIG. 2, elements corresponding to elements in FIG. 1 are shown in the same numerals as FIG. 1.

When the electrode active material 12 is not dissolved in the electrolytic solution 13 as illustrated in FIG. 2, an electrode reaction occurs only at a portion 14 where three members of electrode collector 11, electrode active material 12, and electrolytic solution 13 adjoin one another (i.e., a contour portion at which the electrode active material 12 adjoins the electrode collector 11). On the other hand, when the electrode active material 12 is dissolved in the electrolytic solution 13 as in FIG. 1, an electrode reaction occurs on a surface 16 where the electrode active material-dissolved portion 15 adjoins the electrode collector 11. More specifically, in FIG. 1 (when the electrode active material 12 is dissolved in the electrolytic solution 13), an electrode reaction occurs in a far wider range than in FIG. 2 (when the electrode active material 12 is not dissolved in the electrolytic solution 13), so that the difference between the voltage at the time of discharging and the voltage at the time of charging can be small, ensuring good energy efficiency, and the charge/discharge life can be long.

In addition, for example, when the electrode active material 12 is a metal fluoride, an electrode reaction converts the metal fluoride into, for example, a metal and a fluoride ion through electrochemical reduction. In this case, the fluoride ion reacts with a cation in the electrolytic solution 13 to produce a fluoride precipitate, and the reaction may not proceed any more (the reaction is irreversible). However, an anion receptor that is present in the electrolytic solution 13 can form a salt or a complex with the fluoride ion in the electrode active material (metal fluoride) 12 and thereby can prevent the fluoride ion from reacting with a cation in the electrolytic solution 13 to produce a fluoride precipitate. As a result, a decrease in the battery reaction overvoltage or an increase in the capacity is brought about, because the electrode active material (metal fluoride) 12 is dissolved in the electrolytic solution 13 (the solubility is increased) as described above. In addition, in the case where the fluoride precipitate is electrochemically oxidized by a reverse reaction to produce a metal fluoride, the anion receptor draws out the fluoride ion from the fluoride precipitate and increases the solubility, facilitating an electrochemical reaction with the metal that is the reduction product above. This brings about a decrease in the battery reaction potential or an increase in the capacity. More specifically, according to the present invention, the voltage at the time of battery discharging rises to increase the capacity, and the voltage at the time of battery charging lowers, as a result, the charge/discharge life is further extended. In the above, a case using a metal fluoride as electrode active material 12 is described, but the same applied to a case using other metal ion-containing fluoride such as metal oxyfluoride and a case using an active material other than a metal ion-containing fluoride. FIGS. 1 and 2 are exemplary schematic views, and the present invention is not limited to these figures and description thereof.

In the battery of the present invention having reached a charged state, as described above, at least one of the positive electrode and the negative electrode contains, as the active material, at least one selected from the group consisting of a metal ion-containing fluoride, a metal oxide, a metal sulfide, a metal nitride, and a metal phosphide; the electrolytic solution contains an anion receptor; and the anion receptor forms a salt or a complex with an anion contained in the active material, thereby enabling the active material to dissolve in the electrolytic solution. The active material is preferably a metal ion-containing fluoride as described above. However, the battery of the present invention may be manufactured in a discharged state. In this case, the secondary battery of the present invention may be a secondary battery containing, for example, a positive electrode, a negative electrode, and an electrolytic solution, wherein the positive electrode contains a typical element-containing fluoride and a metal as the active material; the negative electrode contains a typical element-containing fluoride as the active material; the electrolytic solution contains an anion receptor; and the anion receptor forms a salt or a complex with a fluoride ion of the typical element-containing fluoride, thereby enabling the metal fluoride to dissolve in the electrolytic solution.

The secondary battery of the present invention may have a configuration in which at least one of the positive electrode and the negative electrode contains a metal salt, and a metal ion of the metal salt dissolves in the electrolytic solution and is thereby capable of reversibly undergoing an electrochemical reaction. In this case, in view of battery characteristics, the secondary battery of the present invention is preferably a lithium ion battery. More specifically, the secondary battery of the present invention is preferably a secondary battery in which the metal ion is a lithium cation and the lithium cation is, at the time of discharging, produced on the negative electrode and consumed on the positive electrode and, at the time of charging, produced on the positive electrode and consumed on the negative electrode.

In the electrolytic solution of the secondary battery of the present invention, a typical metal cation may be present, an organic material cation may be present, a quaternary ammonium cation may be present, a lithium cation may be present, or a magnesium cation or a complex thereof may be present.

The secondary battery of the present invention may have a configuration in which, for example, in the secondary battery having reached a fully charged state, the positive electrode contains a transition metal fluoride as the positive electrode active material; and the negative electrode contains a typical metal and a typical metal fluoride as the negative electrode active material. In this case, the typical metal fluoride in the negative electrode active material may be contained in the negative electrode or dissolved in the electrolytic solution. Furthermore, in this case, the transition metal fluoride as the positive electrode active material is not particularly limited but may be, for example, $FeF_2$. The typical metal as the negative electrode active material is not particularly limited but may be, for example, Mg. The typical metal fluoride as the negative electrode active material is not particularly limited but may be, for example, LiF.

The secondary battery of the present invention may have a configuration in which, for example, in the secondary battery having reached a completely discharged state, the positive electrode contains a typical metal fluoride and a transition metal as the positive electrode active material; and the negative electrode contains a typical metal fluoride as the negative electrode active material. In this case, the typical metal fluoride may be contained in at least one of the positive electrode and the negative electrode and may be dissolved in the electrolytic solution. Furthermore, in this case, the typical metal fluoride as the positive electrode active material is not particularly limited but may be, for example, LiF. The transition metal as the positive electrode active material is not particularly limited but may be, for example, Fe. The typical metal fluoride as the negative electrode active material is not particularly limited but may be, for example, $MgF_2$.

In the secondary battery of the present invention, the at least one active material selected from the group consisting of a metal ion-containing fluoride, a metal oxide, a metal sulfide, a metal nitride, and a metal phosphide, may be contained in either a positive electrode active material or an negative electrode active material, or both. However, it is preferred that the positive electrode contains, as the positive electrode active material, at least one selected from the group consisting of a metal ion-containing fluoride, a metal oxide, a metal sulfide, a metal nitride, and a metal phosphide (preferably a metal ion-containing fluoride). Due to this configuration, the difference between the voltage at the time of discharging and the voltage at the time of charging is more reduced, and the energy efficiency is more improved.

The metal ion-containing fluoride, metal oxide, metal sulfide, metal nitride, and metal phosphide (hereinafter, referred to as "metal salt active material of the present invention") (above all, a metal ion-containing fluoride and among metal ion-containing fluorides, in particular a metal fluoride and a metal oxyfluoride) have a high potential, and thereby being suitable as an electrode active material, in particular as a positive electrode active material. However, the metal salt active material of the present invention, in particular a metal ion-containing fluoride, is hardly soluble in an electrolytic solution, and therefore is disadvantageously difficult to use as an electrode active material. Conventional techniques lack an idea of dissolving the metal salt active material of the present invention, among others, a metal ion-containing fluoride, with the aid of an anion receptor, in particular an idea of causing an anion receptor to act on a cathode active material. According to the present invention, as described above, the electrode active material is dissolved in an electrolytic solution, whereby the electrode reaction becomes a liquid phase reaction and the reactivity is increased. Since the positive electrode contains the metal salt active material of the present invention (in particular a metal ion-containing fluoride) as the positive electrode active material, a lower charge potential and a higher discharge potential are achieved, and in turn the difference between the voltage at the time of discharging and the voltage at the time of charging is more reduced, leading to more improved energy efficiency.

In the secondary battery of the present invention, it is more preferred that the positive electrode contains a metal ion-containing fluoride as the positive electrode active material and the positive electrode active material is a transition metal-containing fluoride. This is because the transition metal-containing fluoride shows a higher potential and thereby being more suitable as the positive electrode active material. The transition metal-containing fluoride is preferably at least one of a transition metal fluoride and a transition metal oxyfluoride. The transition metal oxyfluoride is not particularly limited but is preferably at least one of FeOF and $Fe_2OF_4$. The transition metal-containing fluoride is more preferably at least one of a fourth-period transition metal-containing fluoride and a fourth-period transition metal-containing oxyfluoride. Furthermore, in the secondary battery of the present invention, it is particularly preferred that the positive electrode active material is at least one selected from the group consisting of $CuF_2$, CuF, $FeF_3$, $FeF_2$, $CoF_2$, $CoF_3$, $BiF_3$, $NiF_2$, $MnF_2$, and FeOF.

The secondary battery of the present invention is not limited to a case where the positive electrode contains the metal salt active material of the present invention as the positive electrode active material. That is, in the secondary battery of the present invention, the negative electrode may contain the metal salt active material (in particular a metal-containing fluoride) of the present invention as the negative electrode active material. The negative electrode active material may be, for example, a typical metal fluoride. The typical metal fluoride is preferably at least one of an alkali metal fluoride and an alkaline earth metal fluoride, and the typical metal oxyfluoride is preferably at least one of an alkali metal oxyfluoride and an alkaline earth metal oxyfluoride. Furthermore, in the secondary battery of the present invention, the negative electrode active material is preferably at least one selected from the group consisting of LiF, NaF, KF, $MgF_2$, $CaF_2$, $AlF_3$, CsF, RbF and $(CH_3)_4NF$.

In the secondary battery of the present invention, the anion receptor is preferably an anion receptor allowing an electrolytic solution obtained by dissolving 0.05 mol/L of lithium fluoride (LiF) and 0.05 mol/L of the anion receptor in a mixed solvent resulting from mixing of ethylene carbonate and dimethyl carbonate in a volume ratio of 50:50, to have an electrical conductivity at 25° C. of 0.05 mS/cm or more. The upper limit value of FA is not particularly limited but is, for example, 2.0 mS/cm or less.

The "anion receptor" as used in the present invention means a substance capable of forming a salt or a complex with an anion.

From the standpoint of facilitating dissolution of the metal fluoride, the anion receptor is preferably not too weak in affinity for the fluoride ion. On the other hand, in view of reversibility of the reaction in the secondary battery, i.e., from the standpoint that a complex of the anion receptor and a fluoride ion can release a fluoride ion to again produce the metal fluoride, the affinity between the anion receptor and the fluoride ion is preferably not too strong.

Specifically, the anion receptor is preferably an anion receptor allowing the affinity FA between the anion receptor and a fluoride ion, represented by the following mathematical formula (1), to be 1.44 eV or more in an acetonitrile solution containing the anion receptor and the fluoride ion.

$$FA=E(AR)+E(F^-)-E(AR\cdot F^-) \quad (1)$$

In mathematical formula (1),

E(AR) is the energy of the anion receptor in the acetonitrile solution, $E(F^-)$ is the energy of the fluoride ion in the acetonitrile solution, and $E(AR\cdot F^-)$ is the energy of a complex of the anion receptor and the fluoride anion in the acetonitrile solution.

The upper limit value of FA is not particularly limited but is, for example, 3.00 eV or less.

In mathematical formula (1), calculation of E(AR), $E(F^-)$, and $E(AR\cdot F^-)$ values (i.e., calculation of FA value) can be performed using an all-electron quantum mechanics calculation based on density functional theory. Specifically, generalized gradient approximation (GGA) may be used for the exchange-correlation interaction of electrons, and DNP may be used for the basis function. Furthermore, COSMO approximation (dielectric constant: 37.5) may be used so as to express the solvent effect in the solution. However, the present invention is not limited to this calculation method.

In the present invention, the anion receptor is not particularly limited and may be an organic compound and/or an inorganic compound. The anion receptor preferably contains at least one selected from the group consisting of an organic boron compound, a boric acid ester, a thioboric acid ester, a Lewis acid, $PF_5$, and $BF_3$. The Lewis acid is not particularly limited and includes, for example, $PF_5$ and $BF_3$ above, and may also be other Lewis acids.

In the anion receptor, the above-described organic boron compound, boric acid ester, and thioboric acid ester are preferably an organic boron compound, boric acid ester, and thioboric acid ester, respectively, represented by the following chemical formula (I):

(I)

In chemical formula (I), L(s) may be the same as or different from one another and each of the L(s) is a single bond, an oxygen atom (ether bond), or a sulfur atom (thioether bond), $R^1$(s) may be the same as or different from one another, when the L is a single bond, $R^1$ bonded to the L is a hydrogen atom, a fluorine atom, a halogen atom other than fluorine, or an organic group, when the L is an oxygen atom or a sulfur atom, $R^1$ bonded to the L is a hydrogen atom, a fluorine atom, a halogen atom other than fluorine, an organic group, or a metal, at least one $R^1$ in chemical formula (I) is an organic group, and when $R^1$ is an organic group, the organic group may be integrated with another organic group $R^1$ in the same molecule or a different molecule.

In $R^1$ of chemical formula (I), the organic group may be at least one substituent selected from the group consisting of a linear or branched alkyl group, an aryl group, a heteroaryl group, an aromatic group, and a heterocyclic group. In this case, each of the substituents may or may not be further substituted with one substituent or a plurality of substituents. The further substituent is preferably a fluoro group, and all hydrogen atoms in the organic group are preferably substituted by a fluoro group. Furthermore, the organic group is preferably a group obtained by substituting all hydrogen atoms in a saturated hydrocarbon groups with a fluoro group. In the organic group, the linear or branched alkyl group is preferably a linear or branched alkyl group having a carbon number of 1 to 24. The aryl group is preferably at least one of a phenyl group and a naphthyl group. The heteroaryl group is preferably at least one selected from the group consisting of a pyridyl group, a furyl group, a pyrrolyl group, and a thienyl group. The aromatic group is not particularly limited but may be, for example, a benzyl group. The heterocyclic group is also not particularly limited but may be, for example, a pyrrolidyl group and/or a morpholino group.

In the secondary battery of the present invention, the anion receptor may be, for example, an anion receptor represented by the following chemical formula AR1:

(AR1)

In chemical formula AR1, $R^{11}$, $R^{12}$, and $R^{13}$ may be the same or different and each is selected from the group consisting of an alkyl group, an aromatic group, an ether group, a thioether group, a heterocyclic group, an aryl group, and a heteroaryl group, which are optionally substituted with one or more groups including halogens including F, alkyl, alkoxide, thiol, thioalkoxide, aromatic, ether, or thioether.

The anion receptor may also be a borate-based anion receptor having the following chemical structure AR2:

(AR2)

In chemical formula AR2, $R^{14}$, $R^{15}$, and $R^{16}$ may be the same or different and each is selected from the group consisting of an alkyl group, an aromatic group, a heterocyclic group, an aryl, and a heteroaryl group, which are optionally substituted with one or more groups including halogens including F, alkyl, alkoxide, thiol, thioalkoxide, aromatic, ether, or thioether. Each of $R^{14}$, $R^{15}$, and $R^{16}$ preferably contains F.

The anion receptor may also be a phenyl boron-based anion receptor having the following chemical structure AR3:

(AR3)

In chemical formula AR3, $R^{17}$ and $R^{18}$ may be the same or different and each is selected from the group consisting of an alkyl group, an aromatic group, a heterocyclic group, an aryl group, and a heteroaryl group, which are optionally substituted with one or more groups including halogens including F, alkyl, alkoxide, thiol, thioalkoxide, aromatic, ether, or thioether. Each of $R^{17}$ and $R^{18}$ preferably contains F. Furthermore, $R^{17}$ and $R^{18}$ may be selected from an aromatic compound substituted with substituent group, which includes F and which is the aromatic compound itself having F, as shown by the following chemical formula AR4:

(AR4)

In chemical formula AR4, $X_A$ and $X_B$ may be the same or different and each represents one or multiple hydrogens or non-hydrogen ring substituents independently selected from the group consisting of halogens, including F, alkyl, alkoxide, thiol, thioalkoxide, ether, and thioether. At least one of $X_A$ and $X_B$ preferably contains F.

The anion receptor may also be, for e example, tris (hexafluoroisopropyl) borate (THFIB; MW=511.9 AMU) having the following chemical structure AR5:

(AR5)

The anion receptor may also be, for example, tris(2,2,2-trifluoroethyl) borate (TTFEB; MW=307.9 AMU) having the following chemical structure AR6:

(AR6)

The anion receptor may also be, for example, tris(pentafluorophenyl) borate (TPFPB; MW=511.98 AMU) having the following chemical structure AR7:

(AR7)

The anion receptor may also be, for example, bis(1,1,3,3,3-hexafluoroisopropyl)pentafluorophenyl boronate (BH-FIPFPB; MW-480.8 AMU) having the following structure AR8:

(AR8)

The anion receptor may also be, for example, an anion receptor selected from the group consisting of $(CH_3O)_3B$, $(CF_3CH_2O)_3B$, $(C_3F_7CH_2O)_3B$, $[(CF_3)_2CHO]_3B$, $[(CF_3)_2(C_6H_5)O]_3B$, $(CF_3)CO)_3B$, $(C_6H_5O)_3B$, $(FC_6H_4O)_3B$, $(F_2C_6H_3O)_3B$, $(F_4C_6HO)_3B$, $(C_6F_5O)_3B$, $(CF_3C_6H_4O)_3B$, $[(CF_3)_2C_6H_3O]_3B$, and $(C_6F_5)_3B$.

For example, in chemical formula AR2, $R^{14}$, $R^{15}$ and $R^{16}$ may be the same as or different from one another, and each represents hydrogen, a metal, or an organic group and these may combine with each other. The metal is preferably an alkali metal or an alkaline earth metal and most preferably lithium.

Preferable examples of the organic group include a hydrocarbon group and a heteroatom-containing hydrocarbon group. The organic group is preferably an organic group having a carbon number of 1 to 10, more preferably an organic group having a carbon number of 1 to 8. The hydrocarbon group includes, for example, a saturated hydrocarbon group such as methyl group, ethyl group, propyl group, butyl group and octyl group; an unsaturated hydrocarbon group, e.g., a double bond-containing hydrocarbon group such as vinyl group and allyl group; and a triple bond-containing hydrocarbon group such as ethynyl group and propargyl group.

The heteroatom in the heteroatom-containing hydrocarbon group includes oxygen, nitrogen, sulfur, phosphorus, boron, etc. Preferable examples of the heteroatom-containing hydrocarbon group include an oxygen-containing hydrocarbon group having an ether bond, an ester bond, a carbonate bond, etc., such as methoxyethyl group and a methoxycarbonylethyl group; and a nitrogen-containing hydrocarbon group having an amino group, etc. The heteroatom is preferably oxygen or nitrogen.

The organic group may be substituted with a halogen atom. The halogen atom includes fluorine, chlorine, bromine, etc., and is preferably fluorine. The organic group substituted with a halogen atom include a halogenated hydrocarbon group such as trifluoroethyl group, a hydrocarbon group substituted with a halogen-containing group, a halogenated, heteroatom-containing hydrocarbon group, etc. Among these, a halogenated hydrocarbon group is preferred.

The boric acid ester represented by chemical formula AR2 may be, for example, alkyl borate esters such as trimethyl borate, triethyl borate, tripropyl borate, tributyl borate, tripentyl borate, diethylmethyl borate, tri(methoxyethyl) borate, dimethyl hydroxyborate, monolithium salt of dimethyl borate, and dilithium salt of monomethyl borate.

The boric acid ester represented by chemical formula AR2 may be, for example, alkyl esters of boric acid condensate, such as trimethoxyboroxine and dimethoxyboroxine monolithium salt; may be compounds having a N-containing substituent, such as triethanolamine borate; or may be the following compounds formed by combining two or more of $R^{14}$, $R^{15}$, and $R^{16}$ with each other:

Furthermore, the boric acid ester represented by chemical formula AR2 may be, for example, tri(trifluoroethyl) borate, methyldi(trifluoroethyl) borate, tri(trichloroethyl) borate, tri (tetrafluoroethyl) borate, tri(monofluoroethyl) borate, tri(p- entafluoropropyl) borate, tri(hexafluoropropyl) borate, tri(2-methyl-1,1,1,3,3,3-hexafluoropropyl) borate, tri(2-phenyl-1,1,1,3,3,3-hexafluoropropyl) borate, tri(trifluoroethoxyethyl) borate, methyldi(trifluoroethoxyethyl) borate, or a halogen-containing boric acid ester, e.g., the following compounds formed by combining substituents with each other:

In the case of a halogen-containing boric acid ester, the oxidation-resistant stability to a positive electrode is advantageously increased due to an electron-withdrawing effect of a halogen atom.

In particular, the anion receptor is preferably at least one selected from the group consisting of the following boron compounds (1) to (8).

(1)

(2)

(3)

(4)

(5)

(6)

(7)

(8)

Furthermore, as described above, the anion receptor may contain an inorganic anion receptor. The inorganic anion receptor is preferably at least one selected from the group consisting of a Lewis acids, $PF_5$, and $BF_3$. The Lewis acids is not particularly limited but may be, for example, $PF_5$, or $BF_3$ above or may be other Lewis acids.

In the secondary battery of the present invention, the content of the anion receptor in the electrolytic solution is not particularly limited but is, for example, from 0.01 to 1.0 mol/L, preferably from 0.02 to 0.5 mol/L, more preferably from 0.05 to 0.2 mol/L. From the standpoint that the anion receptor forms a complex with a fluoride ion of the above-described metal fluoride, and thereby allowing the metal fluoride to dissolve in the electrolytic solution, the content of the anion receptor is preferably not too small. On the other hand, from the standpoint of preventing reduction of battery characteristics due to, e.g., an increase in the viscosity of the electrolytic solution, the content of the anion receptor is preferably not too large. Furthermore, in the secondary battery of the present invention, the kind, content, etc., of the anion receptor in the electrolytic solution are preferably selected appropriately so as to prevent, e.g., excessive self-discharge at the positive electrode due to excessively high solubility of the electrode active material for the electrolytic solution.

In the secondary battery of the present invention, the component in the electrolytic solution other than the anion receptor is not particularly limited. In the electrolytic solution, the electrolyte may be water-soluble and may also be water-insoluble. The electrolyte includes, for example, $LiPF_6$, $LiBF_4$, $LiClO_4$, $LiSO_2CF_3$, $Li(CF_3SO_2)_2N$, $LiAsF_6$, $LiSbF_6$, $Li(C_2F_5SO_2)_2N$, and Na salt, K salt, Cs salt, Rb salt, Mg salt, Ca salt, and quaternary ammonium salt thereof; and one kind of an electrolyte may be used, or a plurality of kinds of electrolytes may be used in combination. The content of the electrolyte in the electrolytic solution is not particularly limited and may be appropriately set. Furthermore, the solvent in the electrolytic solution is not particularly limited but includes, for example, ethylene carbonate (EC), propylene carbonate, nitromethane, toluene (tol), ethyl methyl carbonate (EMC), propyl methyl carbonate (PMC), diethyl carbonate (DEC), dimethyl carbonate (DMC), methyl butyrate (MB, 20° C.), n-propyl acetate (PA), ethyl acetate (EA), methyl propionate (MP), methyl acetate (MA), 4-methyl-1,3-dioxolane (4MeDOL) ($C_4H_8O_2$), 2-methyltetrahydrofuran (2MeTHF) ($C_5H_{10}O$), 1,2-dimethoxyethane (DME), methyl formate (MF) ($C_2H_4O_2$), dichloromethane (DCM), γ-butyrolactone (γ-BL) ($C_4H_6O_2$), propylene carbonate (PC) ($C_4H_6O_3$), ethylene carbonate (EC, 40° C.) ($C_3H_4O_3$), ethyl monoglyme (EMG), and triglyme (TG); and one kind of a solvent may be used, or a plurality of kinds of solvents may be used in combination.

In the secondary battery of the present invention, the positive electrode and the negative electrode are not particularly limited. However, as described above, at least one of the positive electrode and the negative electrode contains a metal fluoride as the active material. The positive electrode active material and the negative electrode active material are, for example, as described above. The material other than the active material in the positive electrode includes, for example, AB (acetylene black), PVDF (polyvinylidene difluoride), PTFE (polytetrafluoroethylene), and an aluminum sheet; and one kind of a material may be used, or a plurality of kinds of materials may be used in combination. The material other than the active material in the negative electrode includes, for example, a copper sheet, etc.; and one kind of a material may be used, or a plurality of kinds of materials may be used in combination. Furthermore, the secondary battery of the present invention may includes, for example, a separator. The material of the separator is not particularly limited but includes, for example, PP (polypropylene); and one kind of a material may be used, or a plurality of kinds of materials may be used in combination.

The reaction in the secondary battery of the present invention is not particularly limited as well, but in the case where the positive electrode active material is $FeF_3$ and the negative electrode is metallic lithium, for example, a reaction represented by the following chemical reaction formula (A) or (B) occurs. In each of chemical reaction formulae (A) and (B), the reaction from left side to right side is a discharge reaction, In the case of charging, a reverse reaction (i.e., in each of the following chemical reaction formulae (A) and (B), a reaction from right side toward left side) occurs.

$FeF_3+Li \leftrightarrow iFeF_3$ (A)

$LiFeF_3+2Li \leftrightarrow Fe+3LiF$ (B)

Chemical reaction formula (A) is an intercalation reaction (solid phase reaction), and chemical reaction formula (B) is a conversion reaction (liquid phase reaction). The difference in the applied voltage mainly determines which reaction is likely to occur. In the present invention, the above-described effects of the present invention can be obtained by utilizing mainly a conversion reaction (liquid phase reaction).

In the secondary battery of the present invention, the charge voltage is not particularly limited but is preferably a voltage at which a liquid phase reaction is easily utilized. The charge voltage is not particularly limited and may be appropriately set according to the kind, etc. of the electrode active material.

EXAMPLES

In the following, Examples of the present invention are described. However, the present invention is not limited to these Examples.

In this Example, a secondary battery was manufactured by adding an anion receptor represented by any one of chemical formulae (1) to (3) to an electrolyte and evaluated for the characteristics thereof. Chemical formulae (1) to (3) are recited again below. In the following, the anion receptor of chemical formula (1) is referred to as "TTFEBO"; the anion receptor of chemical formula (2) is referred to as "TPFPB"; and the anion receptor of chemical formula (3) is referred to as "THFiPBO". "TTFEBO" stands for "tris(2,2,2-trifluoroethyl) borate"; "TPFPB" stands for tris(pentafluorophenyl)borane; and "THFiPBO" stands for tris(hexafluoroisopropyl) borate.

(1)

TTFEBO (2)

TPFPB (3)

THFiPBO

Examples 1 to 6

Six lithium batteries each having the cell configurations shown in Table 1 below were fabricated by the same manner other than the kind and addition amount of the anion receptor added to the electrolytic solution differ, and were allotted to Examples 1 to 6, respectively. The composition of the electrolytic solution was as shown in Table 2. In Table 1, "Coin Cell Size 2032 Type" indicates a coin cell (lithium battery) of 20 mm in diameter and 3.2 mm in height, and "SUS316" is one of JIS standards regarding stainless steels. Other abbreviations in Tables 1 and 2 have the meanings described in the margin of Table 1.

| Coin Cell Size | 2032 Type |
|---|---|
| Positive electrode | FeF$_3$ (produced by Soegawa Rikagaku) + AB + PVDF (75:20:5 wt %) applied to Al collector foil, φ15 mm |
| Electrolytic solution | shown separately |
| Negative electrode | metallic Li (thickness: 0.2 mm), φ15 mm |
| Separator | polypropylene microporous body, 25 μm |
| Positive electrode case | interiorly Al-clad SUS316 |
| Negative electrode cap | SUS316 |
| Cell assembly environment | glove box (Ar atmosphere) |

AB: Acetylene black
PVDF: PolyVinylidene DiFluoride
EC: Ethylene carbonate
DMC: Dimethyl carbonate

| Example | | |
|---|---|---|
| (1) 1M LiPF$_6$ + anion receptor | | 0.1M TTFEBO |
| (2) (see, right column) in | | 0.05M TTFEBO |
| (3) EC:DMC = 1:1(vol./%) solvent | | 0.1M TPFPB |
| (4) | | 0.05M TPFPB |
| (5) | | 0.1M THFiPBO |
| (6) | | 0.05M THFiPBO |

In Tables 3 and 4, the affinity between the anion receptor and fluoride ion F$^-$ used in this Example, are shown as the value of the conductivity (Table 3) and of all-electron quantum mechanics calculation (Table 4). The electron affinity in Table 4 below is FA represented by mathematical formula (1). Mathematical formula (1) is again recited below. The meaning of each symbol in mathematical formula (1) and the calculation method of those symbols are as described above.

$$FA=E(AR)+E(F^-)-E(AR\cdot F^-) \quad (1)$$

Affinity Between AR and F$^-$ (Ionic Conductivity)

| Addition of anion receptor to 0.05M LiF-added EC/DMC solution | Conductivity (*1) |
|---|---|
| no addition | not more than detection limit (<1.0E−08) |
| 0.05M TTFEBO | 5.4E−05 |
| 0.05M TPFPB | 1.1E−03 |
| 0.05M THFiPBO | 7.4E−04 |

(*1) This is a conductivity (S/cm) at 25° C. of an electrolytic solution prepared by dissolving 0.05 mol/L of LiF and 0.05 mol/L of an anion receptor in a mixed solvent of ethylene carbonate and dimethyl carbonate (50:50 v/v %). "1.0E−08" refers to 1.0 × 10$^{-8}$, "5.4E−05" refers to 5.4 × 10$^{-5}$, "1.1E−0.3" mans 1.1 × 10$^{-3}$, and "7.4E−04" refers to 7.4 × 10$^{-4}$.

Affinity Between AR and F$^-$ (Value in all-Electron Quantum Mechanics Calculation)

| Anion receptor | Affinity of Anion receptor for F$^-$ (eV) |
|---|---|
| TPFPB | 2.24 |
| THFiPBO | 1.77 |
| TTFEBO | 1.44 |

[Evaluation of Battery Characteristics]

The secondary batteries of Examples 1 to 6 were evaluated for the enhancement of life and the reduction in charge voltage, under the following conditions. Furthermore, a battery (Comparative Example 1) is manufactured by the same manner as those of Examples 1 to 6 other than not adding (no addition) anion receptor to the electrolytic solution, and evaluated similarly for the enhancement of life and the reduction in charge overvoltage. Details are as follows.

[Charge/Discharge Characteristics]

In each of the batteries of Examples 1 to 6, charge/discharge was repeated three times under the following conditions, and the enhancement of life and the reduction in charge voltage were evaluated by the following measurement and calculation.

Charge/discharge conditions: 1.0 V-4.5 V
Charge/discharge current density: 0.080 mA/cm$^2$
Temperature in test environment: 25° C.

[Evaluation of Enhancement of Life]

The enhancement of life of the battery was evaluated by the following "ratio of percentage retention assuming that the percentage capacity retention of no addition (Comparative Example 1) is 1" and "ratio of percentage deterioration assuming that the percentage deterioration of no addition (Comparative Example 1) to 1. Please note that no addition" indicates, as described above, that an anion receptor was not added to the electrolytic solution of the battery of Comparative Example 1.

The "ratio of percentage of retention when converting the percentage of capacity retention of no addition (Comparative Example 1) to 1" was calculated (mathematical formula (12) shown below) by dividing the percentage capacity retention (calculated according to the following mathematical formula (11)) of each Example (an anion receptor was added), by the percentage capacity retention of Comparative Example 1 (an anion receptor was not added).

Percentage of capacity retention=discharge capacity at third cycle/discharge capacity at first cycle (11)

Ratio of percentage of retention assuming that the percentage of capacity retention of no addition (Comparative Example 1) to 1=percentage of capacity retention of each Example/percentage of capacity retention of Comparative Example 1 (12)

The "ratio of percentage of deterioration when converting the percentage of deterioration of no addition (Comparative Example 1) to 1" was calculated (mathematical formula (14) shown below) by dividing the percentage of deterioration (mathematical formula (13) shown below) of each Example, by the percentage of deterioration of Comparative Example 1.

Percentage deterioration=1−percentage of capacity retention at third cycle (13)

Ratio of percentage of deterioration when converting the percentage of deterioration of no addition (Comparative Example 1) to 1=percentage of deterioration of each Example/percentage of deterioration of Comparative Example 1 (14)

[Evaluation of Reduction in Charge Voltage]

With respect to the secondary batteries of Example and Comparative Example 1, under the charging condition, the average charge voltage in the area from a first-stage charge curve by a conversion reaction to an inflection point which combines the first-stage charge curve with a second-stage charge curve, was regarded as "charge voltage (V) in the conversion reaction region", and the reduction in charge voltage in the conversion reaction region was evaluated.

The results of life enhancement evaluation on the secondary batteries of Examples 1 to 6 and Comparative Example 1 are shown in Table 5 below. As shown in the upper row of the Table, when converting the percentage of capacity retention of the secondary battery of Comparative Example 1 to 1.0 (relative value), the percentage of capacity retention of the secondary batteries of Examples 1 to 6 is from 1.12 to 1.27, revealing that the life was enhanced by 12 to 27%.

Effects of Invention: Enhancement of Life

| | Comparative Example | Example | | | | | |
| --- | --- | --- | --- | --- | --- | --- | --- |
| | | TTFEBO | | TPFPB | | THFiPBO | |
| | (1) No Addition | (1) 0.1M | (2) 0.05M | (3) 0.1M | (4) 0.05M | (5) 0.1M | (6) 0.05M |
| Ratio of percentage of retention when converting the percentage of capacity retention of no addition to 1 | 1.0 | 1.27 | 1.17 | 1.12 | 1.16 | 1.21 | 1.12 |
| Ratio of percentage of deterioration when converting the percentage of deterioration of no addition to 1 | 1.0 | 0.65 | 0.79 | 0.80 | 0.73 | 0.66 | 0.80 |

The results of evaluation of reduction in the charge voltage are shown in Table 6 below. As shown in the Table, in the secondary battery of Example, the charge voltage was apparently reduced, compared with Comparative Example 1 (an anion receptor was not added).

Effects of Invention: Reduction in Charge Voltage

| | Comparative Example (1) No addition | Example | |
| --- | --- | --- | --- |
| | | TTFEBO (1) 0.1M | TPFPB (3) 0.1M |
| Average charge voltage (V) in conversion reaction region | 2.684 | 2.564 | 2.562 |

Example 7

A lithium secondary battery was manufactured as follows. The assembly was performed in an argon-purged glove box, similarly to Examples 1 to 6.

Coin cell: diameter: 20 mm, thickness: 3.2 mm

Positive electrode pellet: $FeF_2$: 70 wt % (about 0.055 g), acetylene black (carbon): 25 wt %, PTFE (polytetrafluoroethylene, trade name: "Teflon (registered trademark)"): 5 wt %, diameter: 13 mm, thickness: about 0.5 mm Negative electrode: Li metal sheet, diameter: 13 mm, thickness: 0.2 mm Electrolytic solution: 1 M $LiPF_6$ EC/DMC (volume ratio: 1:1, density: about 1.3 g/cm$^3$) having added thereto 0.2 M TPFPB Separator: Polypropylene microporous film Molar ratio of $FeF_2$ and TPFPB in coin cell: about 1:0.14

[Charge/Discharge Characteristics (Enhancement of Life)]

In the battery of Example 7, charge/discharge was repeated 5 times under the following conditions.

Figure 3:
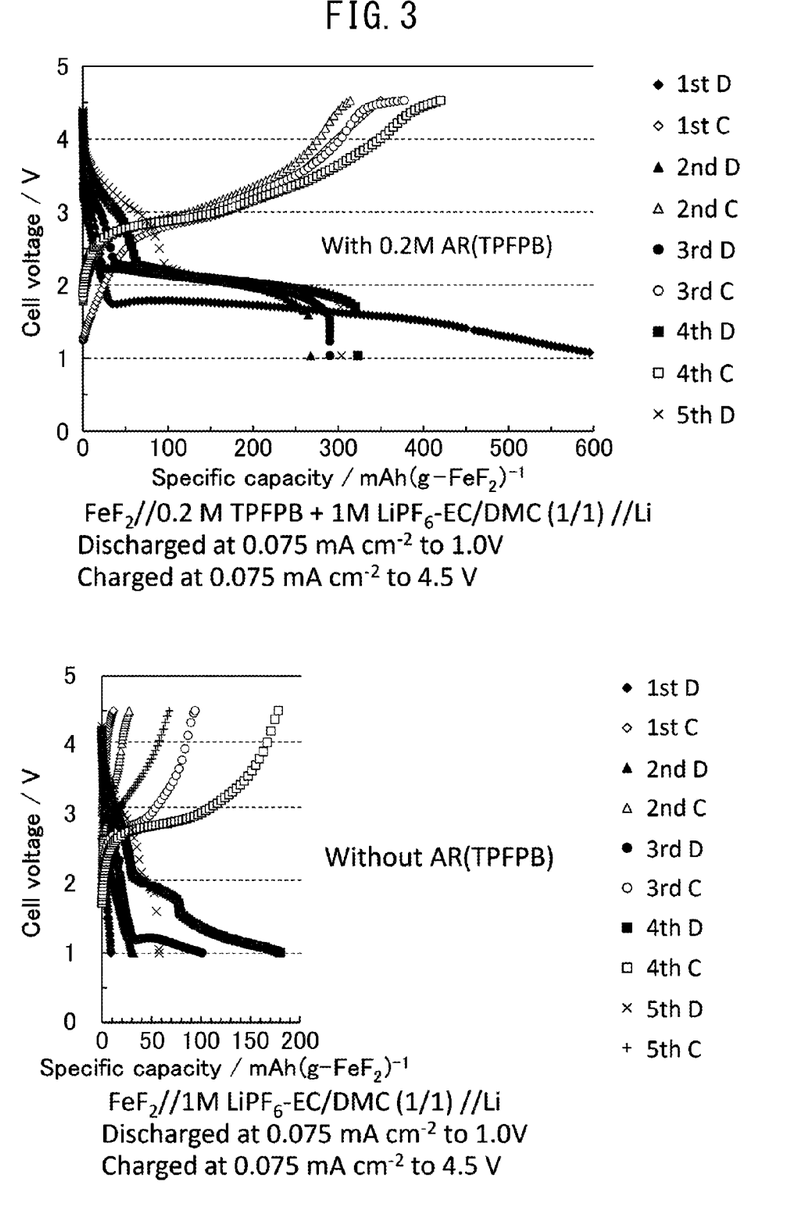
FIG. 3 is a view depicting the charge/discharge results in the secondary batteries of Example and Comparative Example.

Charge/discharge conditions: 1.0 V-4.5 V
Charge/discharge current density: 0.075 mA/cm$^2$ The graph on the upper side of FIG. 3 shows the results of the above-described charge/discharge in the battery of Example 7. In the figure, the ordinate is the cell voltage [V], and the abscissa is Specific capacity, i.e., weight capacity density [mAh(g–FeF$_2$)$^{-1}$]. The plot in the Table indicates Discharged (at the time of discharging), and "C" indicates Charged (at the time of charging). Furthermore, the graph on the lower side of FIG. 3 shows the results when in a battery (Comparative Example 2) that is the same as that of Example 7 other than not adding TPFPB (anion receptor), charge/discharge was repeated 5 times under the same conditions. In the figure, the plots on the ordinate and abscissa have the same meanings as in the graph on the upper side (Example 7). As illustrated in FIG. 3, it was confirmed that in Example 7 (the graph on the upper side, with an anion receptor), the reduction in the weight capacity density due to repetition of charge/discharge is smaller and the life is longer than in Comparative Example 2 (the graph on the lower side, without an anion receptor).

INDUSTRIAL APPLICABILITY

As described in the foregoing pages, according to the present invention, a secondary battery in which the difference between the voltage at the time of discharging and the voltage at the time of charging is small, ensuring good energy efficiency, and the charge/discharge life is long, can be provided. The secondary battery of the present invention is not particularly limited in its usage and can be utilized in a very wide range of applications, for example, in an electric car, or in the application to power storage for home or business use, or power storage for equalizing photovoltaic power generation, wind power generation, etc.

DESCRIPTION OF NUMERICAL REFERENCES

11 Electrode collector
12 Electrode active material
13 Electrolytic solution
14 Portion at which three members of electrode collector 11, electrode active material 12, and electrolytic solution 13 adjoin one another
15 Electrode active material-dissolved portion
16 Surface where the electrode active material-dissolved portion 15 adjoins the electrode collector 11

What is claimed is:

1. A secondary battery containing a positive electrode, a negative electrode, and an electrolytic solution,
   wherein at least one of the positive electrode and the negative electrode contains, as the active material, at least one selected from the group consisting of a metal ion-containing fluoride, a metal oxide, a metal sulfide, a metal nitride, and a metal phosphide,
   wherein the electrolytic solution contains an anion receptor,
   wherein the anion receptor forms a salt or a complex with an anion contained in the active material, thereby enabling the active material to dissolve in the electrolytic solution, and
   wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide,
   wherein at least one of the positive electrode and the negative electrode contains a metal salt,
   wherein a metal ion of the metal salt dissolves in the electrolytic solution, and thereby being capable of reversibly undergoing an electrochemical reaction together with the salt or complex formed from the anion receptor and the anion,
   wherein the metal ion is a lithium cation, and
   wherein the lithium cation is, at the time of discharging, produced on the negative electrode and consumed on the positive electrode and, at the time of charging, produced on the positive electrode and consumed on the negative electrode.

2. The secondary battery according to claim 1, wherein the active material contained in at least one of the positive electrode and the negative electrode is a metal ion-containing fluoride, and
   wherein the anion receptor forms a salt or a complex with a fluoride ion of the metal ion-containing fluoride, thereby enabling the metal ion-containing fluoride to dissolve in the electrolytic solution.

3. The secondary battery according to claim 1, wherein the metal ion-containing fluoride is at least one of a metal fluoride and a metal oxyfluoride.

4. The secondary battery according to claim 1 wherein a typical metal cation is present in the electrolytic solution.

5. The secondary battery according to claim 1, wherein an organic material cation is present in the electrolytic solution.

6. The secondary battery according to claim 1, wherein a quaternary ammonium cation is present in the electrolytic solution.

7. The secondary battery according to claim 1, wherein a sodium cation is present in the electrolytic solution.

8. The secondary battery according to claim 1, wherein a magnesium cation or a complex thereof is present in the electrolytic solution.

9. The secondary battery according to claim 1, wherein the anion receptor contains at least one selected from the group consisting of an organic boron compound, a boric acid ester, a thioboric acid ester, a Lewis acid, PF$_5$, and BF$_3$.

10. The secondary battery according to claim 9, wherein the organic boron compound, boric acid ester, and thioboric acid ester are, respectively, an organic boron compound, boric acid ester, and thioboric acid ester represented by the following chemical formula (I):

(I)

in chemical formula (I),
   L(s) may be the same as or different from one another and each of the L(s) is a single bond, an oxygen atom (ether bond), or a sulfur atom (thioether bond),
   R$^1$(s) may be the same as or different from one another,
   when the L is a single bond, R$^1$ bonded to the L is a hydrogen atom, a fluorine atom, a halogen atom other than fluorine, or an organic group,
   when the L is an oxygen atom or a sulfur atom, R$^1$ bonded to the L is a hydrogen atom, a fluorine atom, a halogen atom other than fluorine, an organic group, or a metal, at least one R¹ in chemical formula (I) is an organic group, and when R¹ is an organic group, the organic group may be integrated with another organic group R¹ in the same molecule or a different molecule.

11. The secondary battery according to claim 10, wherein in R¹ of chemical formula (I), the organic group is at least one substituent selected from the group consisting of a linear or branched alkyl group, an aryl group, a heteroaryl group, an aromatic group, and a heterocyclic group; and each of the substituents may or may not be further substituted with one substituent or a plurality of substituents.

12. The secondary battery according to claim 11, wherein the linear or branched alkyl group is a linear or branched alkyl group having a carbon number of 1 to 24, wherein the aryl group is at least one of a phenyl group and a naphthyl group, and wherein the heteroaryl group is at least one selected from the group consisting of a pyridyl group, a furyl group, a pyrrolyl group, and a thienyl group.

13. The secondary battery according to claim 11, wherein the further substituent is a fluoro group.

14. The secondary battery according to claim 11, wherein all hydrogen atoms in the organic group are substituted by a fluoro group.

15. The secondary battery according to claim 11, wherein the organic group is a group obtained by substituting all hydrogen atoms in a saturated hydrocarbon groups by a fluoro group.

16. The secondary battery according to claim 1, wherein the anion receptor is at least one selected from the group consisting of the following boron compounds (1) to (8):

(1)

(2)

(3)

(4)

(5)

(6)

(7)

-continued (8)

17. The secondary battery according to claim 1, wherein the anion receptor contains an inorganic anion receptor.

18. The secondary battery according to claim 17, wherein the inorganic anion receptor is at least one selected from the group consisting of Lewis acid, $PF_5$, and $BF_3$.

19. A secondary battery containing a positive electrode, a negative electrode, and an electrolytic solution,
wherein at least one of the positive electrode and the negative electrode contains, as the active material, at least one selected from the group consisting of a metal ion-containing fluoride, a metal oxide, a metal sulfide, a metal nitride, and a metal phosphide,
wherein the electrolytic solution contains an anion receptor,
wherein the anion receptor forms a salt or a complex with an anion contained in the active material, thereby enabling the active material to dissolve in the electrolytic solution, and
wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide,
wherein in the secondary battery having reached a fully charged state,
the positive electrode contains a transition metal-containing fluoride as the positive electrode active material;
the negative electrode contains a typical metal and a typical metal fluoride as the negative electrode active material; and
the typical metal fluoride in the negative electrode active material may be present in the negative electrode and/or dissolved in the electrolytic solution.

20. The secondary battery according to claim 19, wherein the transition metal-containing fluoride is at least one of a fluoride of a fourth-period transition metal and an oxyfluoride of a fourth-period transition metal.

21. The secondary battery according to claim 19, wherein the typical metal fluoride is at least one of an alkali metal fluoride and an alkaline earth metal fluoride.

22. A secondary battery containing a positive electrode, a negative electrode, and an electrolytic solution,
wherein at least one of the positive electrode and the negative electrode contains, as the active material, at least one selected from the group consisting of a metal ion-containing fluoride, a metal oxide, a metal sulfide, a metal nitride, and a metal phosphide,
wherein the electrolytic solution contains an anion receptor,
wherein the anion receptor forms a salt or a complex with an anion contained in the active material, thereby enabling the active material to dissolve in the electrolytic solution, and
wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide,
wherein the positive electrode active material is at least one selected from the group consisting of $CuF_2$, CuF, $FeF_3$, $FeF_2$, $CoF_2$, $CoF_3$, $BiF_3$, $NiF_2$, $MnF_2$, and FeOF.

23. A secondary battery containing a positive electrode, a negative electrode, and an electrolytic solution,
wherein at least one of the positive electrode and the negative electrode contains, as the active material, at least one selected from the group consisting of a metal ion-containing fluoride, a metal oxide, a metal sulfide, a metal nitride, and a metal phosphide,
wherein the electrolytic solution contains an anion receptor,
wherein the anion receptor forms a salt or a complex with an anion contained in the active material, thereby enabling the active material to dissolve in the electrolytic solution, and
wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide,
wherein in the secondary battery having reached a completely discharged state,
the positive electrode contains a typical metal fluoride and a transition metal as the positive electrode active material,
the negative electrode contains a typical metal fluoride as the negative electrode active material, and
the typical metal fluoride may be present in at least one of the positive electrode and the negative electrode and may be dissolved in the electrolytic solution.

24. A secondary battery containing a positive electrode, a negative electrode, and an electrolytic solution,
wherein at least one of the positive electrode and the negative electrode contains, as the active material, at least one selected from the group consisting of a metal ion-containing fluoride, a metal oxide, a metal sulfide, a metal nitride, and a metal phosphide,
wherein the electrolytic solution contains an anion receptor,
wherein the anion receptor forms a salt or a complex with an anion contained in the active material, thereby enabling the active material to dissolve in the electrolytic solution, and
wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide,
wherein the negative electrode active material is at least one selected from the group consisting of LiF, NaF, KF, $MgF_2$, $CaF_2$, $AlF_3$, CsF, RbF, and $(CH_3)_4NF$.

25. A secondary battery containing a positive electrode, a negative electrode, and an electrolytic solution,
wherein at least one of the positive electrode and the negative electrode contains, as the active material, at least one selected from the group consisting of a metal ion-containing fluoride, a metal oxide, a metal sulfide, a metal nitride, and a metal phosphide, wherein the electrolytic solution contains an anion receptor, wherein the anion receptor forms a salt or a complex with an anion contained in the active material, thereby enabling the active material to dissolve in the electrolytic solution, and wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide, wherein the anion receptor is an anion receptor allowing an electrolytic solution obtained by dissolving 0.05 mol/L of lithium fluoride (LiF) and 0.05 mol/L of the anion receptor in a mixed solvent resulting from mixing of ethylene carbonate and dimethyl carbonate in a volume ratio of 50:50, to have an electrical conductivity at 25° C. of 0.05 mS/cm or more.

26. A secondary battery containing a positive electrode, a negative electrode, and an electrolytic solution, wherein at least one of the positive electrode and the negative electrode contains, as the active material, at least one selected from the group consisting of a metal ion-containing fluoride, a metal oxide, a metal sulfide, a metal nitride, and a metal phosphide, wherein the electrolytic solution contains an anion receptor, wherein the anion receptor forms a salt or a complex with an anion contained in the active material, thereby enabling the active material to dissolve in the electrolytic solution, and wherein the anion forming a salt or a complex with the anion receptor is at least one anion selected from the group consisting of a fluoride ion of the metal ion-containing fluoride, an oxide ion of the metal oxide, a sulfide ion of the metal sulfide, a nitride ion of the metal nitride, and a phosphide ion of the metal phosphide, wherein the anion receptor is an anion receptor allowing the affinity FA between the anion receptor and a fluoride ion, represented by the following mathematical formula (1), to become 1.44 eV or more in an acetonitrile solution containing the anion receptor and the fluoride ion:

$$FA = E(AR) + E(F^-) - E(AR \cdot F^-) \quad (1)$$

in mathematical formula (1), $E(AR)$ is the energy of the anion receptor in the acetonitrile solution, $E(F^-)$ is the energy of the fluoride ion in the acetonitrile solution, and $E(AR \cdot F^-)$ is the energy of a complex of the anion receptor and the fluoride anion in the acetonitrile solution.

\* \* \* \* \*